United States Patent [19]

Itoh

[11] Patent Number: 4,662,763
[45] Date of Patent: May 5, 1987

[54] TUBULAR BEARING FOR LINEAR MOTION
[75] Inventor: Katsutoshi Itoh, Yamatotakada, Japan
[73] Assignee: Tsubakimoto Precision Products Co., Ltd., Osaka, Japan
[21] Appl. No.: 804,654
[22] PCT Filed: Apr. 5, 1985
[86] PCT No.: PCT/JP85/00172
§ 371 Date: Nov. 13, 1985
§ 102(e) Date: Nov. 13, 1985
[87] PCT Pub. No.: WO85/05156
PCT Pub. Date: Nov. 21, 1985

[30] Foreign Application Priority Data

Apr. 28, 1984 [JP] Japan ................................ 59-85171
Jul. 6, 1984 [JP] Japan ................................ 59-138958
Oct. 19, 1984 [JP] Japan ........................ 59-157123[U]
Oct. 19, 1984 [JP] Japan ........................ 59-157124[U]
Dec. 27, 1984 [JP] Japan ........................ 59-196312[U]

[51] Int. Cl.⁴ ........................................... F16C 29/06
[52] U.S. Cl. ...................................... 384/45; 384/43
[58] Field of Search ........................... 384/13, 43–45, 384/451

[56] References Cited

U.S. PATENT DOCUMENTS 253,679   2/1882  Büssing ............................. 384/451
750,771   1/1904  Keil ................................... 384/451
1,185,114 5/1916  McIlwain ........................... 384/451
2,672,379 3/1954  McVey ............................... 384/45
3,044,835 7/1962  Hurd .................................. 384/45
3,304,133 2/1967  Strassberg ......................... 384/44
4,095,854 6/1978  Teramachi .......................... 384/45
4,417,771 11/1983 Teramachi .......................... 384/45
4,547,024 10/1985 Teramachi .......................... 384/45

FOREIGN PATENT DOCUMENTS 48-16006  5/1974  Japan .
51-10276  3/1976  Japan .
56-105117 8/1981  Japan .
59-166022 11/1984 Japan .
59-171221 11/1984 Japan .
131475    8/1919  United Kingdom ................ 384/451

Primary Examiner—Stuart S. Levy
Assistant Examiner—Thomas R. Hannon
Attorney, Agent, or Firm—Howson and Howson

[57] ABSTRACT

A linear motion bearing used for guiding portions which perform a linear motion such as a machine tool table and a positioning table. A circulation path of balls (8, 28) is formed a two-part split tube (3, 3') of opposed J shape, or by combination of a two-part split tube (23a) of opposed U shape having a belt-like connection (23c) with a two-part split tube (23b) of opposed J shape, thereby facilitating machining and assembly and attaining reduction of the number of parts.

6 Claims, 31 Drawing Figures

FIG. 16
FIG. 17
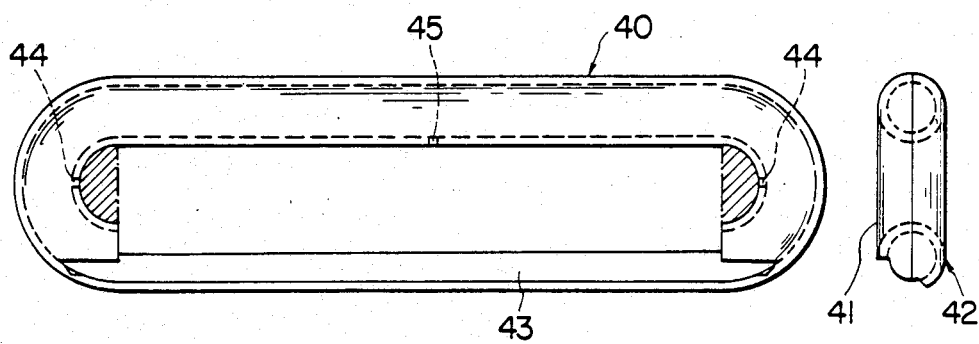
FIG. 18
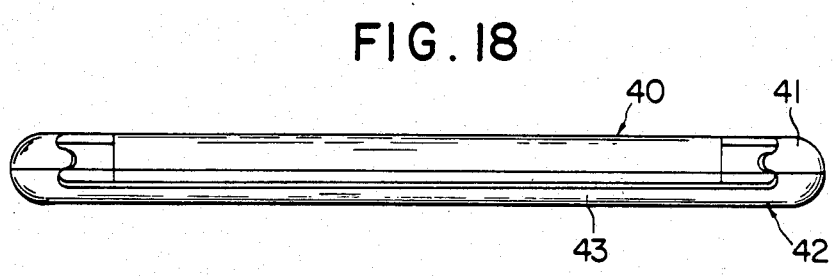
FIG. 19
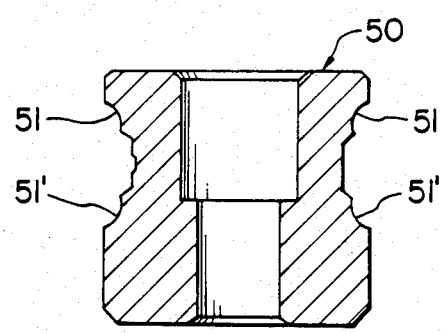

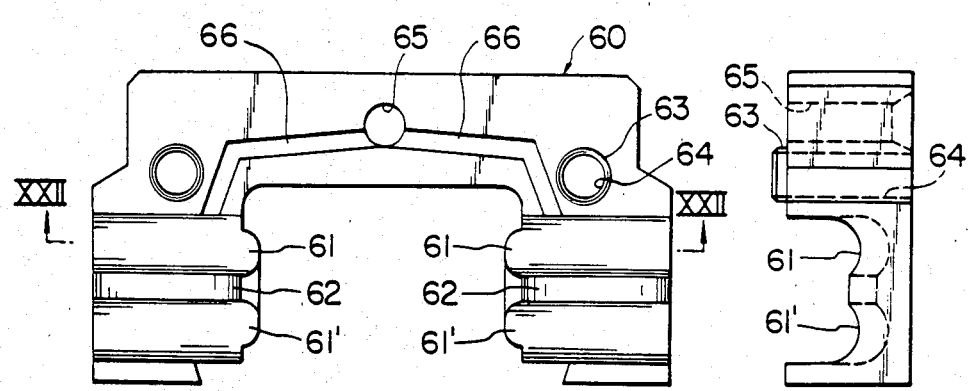
FIG. 20  FIG. 21
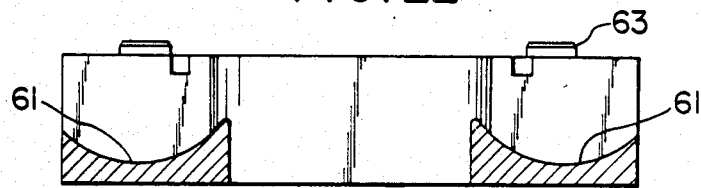
FIG. 22
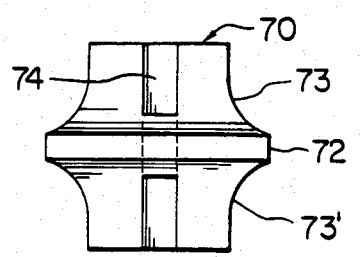 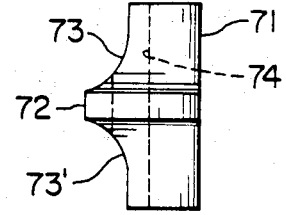
FIG. 23  FIG. 24
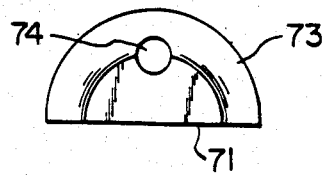
FIG. 25

TUBULAR BEARING FOR LINEAR MOTION

FIELD OF ART

The present invention relates to a bearing for linear motion used for guiding portions which perform a linear motion such as a machine tool table and a positioning table.

BACKGROUND ART

As shown in Japanese Patent Publication No. 38812/82, etc., conventional linear motion bearings of this type are of a construction in which a bearing body is machined to form a ball return hole in its axial direction so that balls may circulate in the axial direction, end portions of the return hole being curved to let the balls change their direction, and both outside end portions thereof are covered with return caps each formed with a direction changing groove for effecting a 180° direction change.

Such construction is disadvantageous in that the number of parts increases and troublesome machinings are required.

DISCLOSURE OF THE INVENTION

The present invention is characterized in that a ball circulation path is formed using a two-part split tube of opposed J shape, whereby the insertion of balls is effected easily and the ball circulation mechanism is simplified remarkably. Moreover, return caps which have heretofore been required become unnecessary, and a secondary machining such as slitting to the bearing body also becomes unnecessary. Additionally, the necessity of curving ball inlet and outlet portions of the bearing body is eliminated.

Besides, since pressed projections and portions contiguous thereto can be inserted up to the inner part of a rail base groove, not only the ball scooping action becomes smoother, but also by forming a ball direction changing part in an ideal arcuate shape, the resistance of ball to direction changing is decreased to a remarkable extent. Further, by applying a resin coating to the tube interior, balls become easier to slide.

The present invention is also characterized in that a two-part split tube of opposed U shape having a belt-like connection and a two-part split tube of opposed J shape are combined to form a ball circulation path, whereby it becomes unnecessary to use a ball retainer.

The present invention further provides a tube mounting cover having a tube fitting groove formed in its inner surface. By putting this cover on end faces of the bearing body and, if necessary, also on side faces thereof, not only the positioning of tube can be done easily, but also the tube protection and the noisereducing effect can be attained. Moreover, it is possible to produce a bearing having a planar appearance not different from conventional ball bearings for linear motion despite using a tube.

Further, in the above mounting cover, by integrally forming a side cover and an end face cover and putting a pair of such covers on both end faces of the bearing body, the positioning of tube can be done easily and the tube holding space can be reduced.

Besides, it becomes unnecessary to machine bolt holes in the bearing body for the mounting of cover, and the total number of parts can be decreased.

Lastly, in the present invention a lubricant feed port is formed in part of the inner peripheral wall of tube so that lubricant can be fed easily into the tube.

BRIEF DESCRIPTION OF THE DRAWINGS

The drawings illustrate embodiments of the present invention, in which

FIGS. 16 to 18 are a top view, side view and front view of a retainer integral type tube;

FIG. 19 is a sectional view of a rail base;

FIGS. 20 to 22 are a front view and side view of an end face cover and a sectional view in the direction of line XXII—XXII of FIG. 20, respectively;

FIGS. 23 to 25 are a front view, side view and top view, respectively, of a spacer;

BEST FORM FOR PRACTICING THE INVENTION

Figure 1:
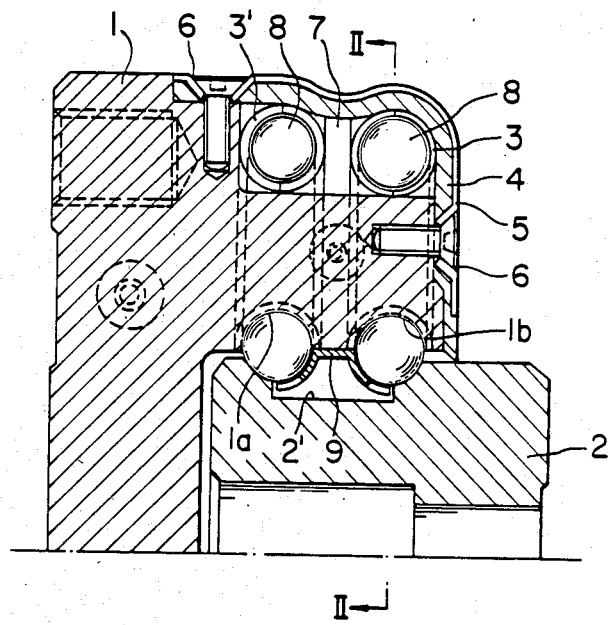
FIG. 1 is a longitudinal sectional view of a first embodiment, with a lower half portion thereof omitted.
Figure 2:
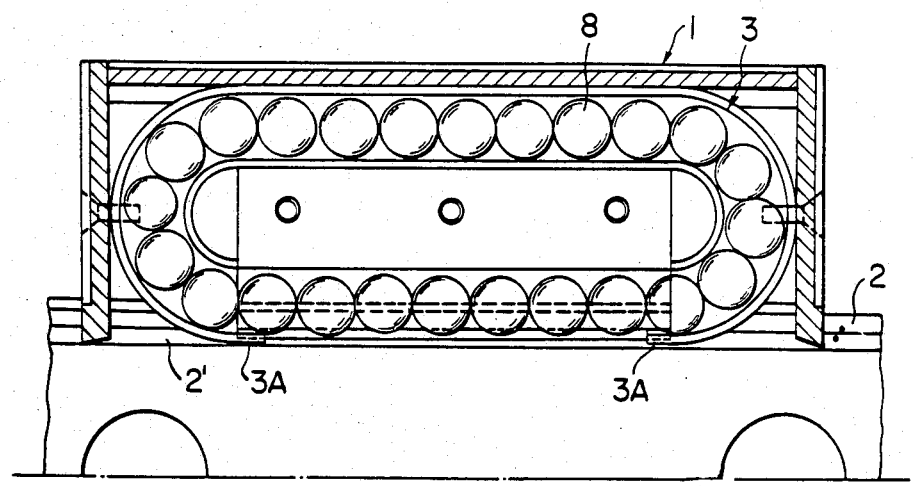
FIG. 2 is a sectional view in the direction of line II—II of FIG. 1.

Embodiments of the present invention will be described below with reference to the accompanying drawings. FIGS. 1 and 2 show an example of using tubes in two rows, in which a lower half portion is omitted because upper and lower portions usually appear symmetrically.

The reference numeral 1 denotes a bearing body and 2 denotes a rail base. The numerals 3 and 3' are a pair of tubes each of opposed J shape. A cover 5 with rubber 4 fused thereto is put on the bearing body 1 and fixed with bolts 6. The numeral 7 denotes a spacer.

The above tube of opposed J shape is split in two, whereby not only press forming but also the mounting of balls can be done easily. But fixing such tube to the bearing body 1 as mentioned above and abutting it to end faces of rail grooves 1a and 1b of a semicircular section, there easily can be formed an endless circulation path of balls 8.

Figure 3:
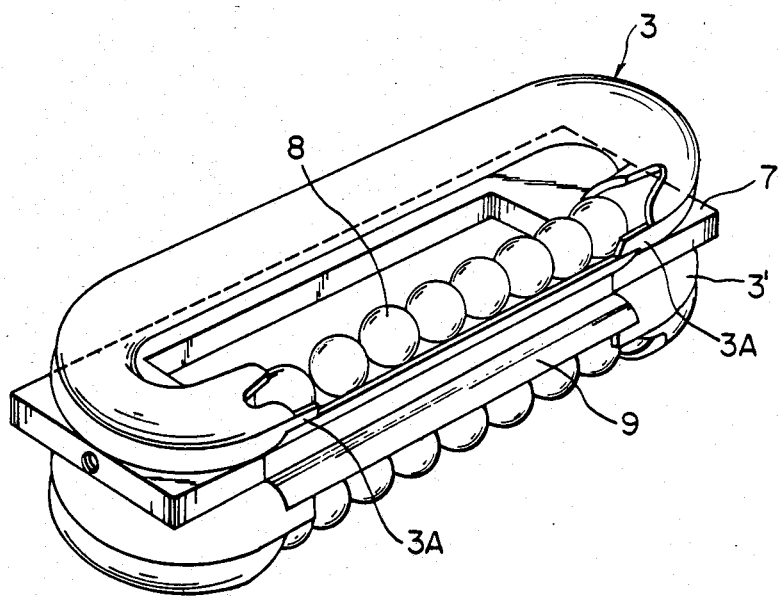
FIG. 3 is partial perspective view of the first embodiment.

In mounting balls, the bearing body 1 is turned upside down and put on an assembly jig, then, as shown in FIG. 3, a tube half, balls, a tube half, a spacer, a retainer, a tube half, balls and a tube half are put one upon another in this order, and thereafter the cover is bolted. Thus, the ball mounting operation is very simple.

In the case of a double-row ball race, only one side of a two-part split tube is provided with a projection 3A for fixing a ball fall-off preventing retainer 9, whereby the need of, for example, screwing the retainer 9 to the bearing body 1 is eliminated.

As shown in FIG. 2, the projections 3A of the tube 3 and portions contiguous thereto can be inserted up to the inner part of a groove 2' of the rail base 2 and so the ball scooping action can be done smoothly. Moreover, the ball direction changing portions of the tubes 3 and 3' are made arcuate as shown, thereby permitting a marked reduction of resistance.

Figure 4:
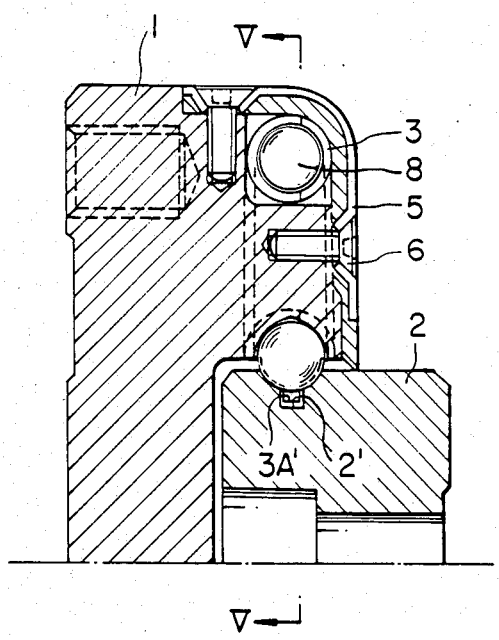
FIG. 4 is a view corresponding to FIG. 1, illustrating a second embodiment.
Figure 5:
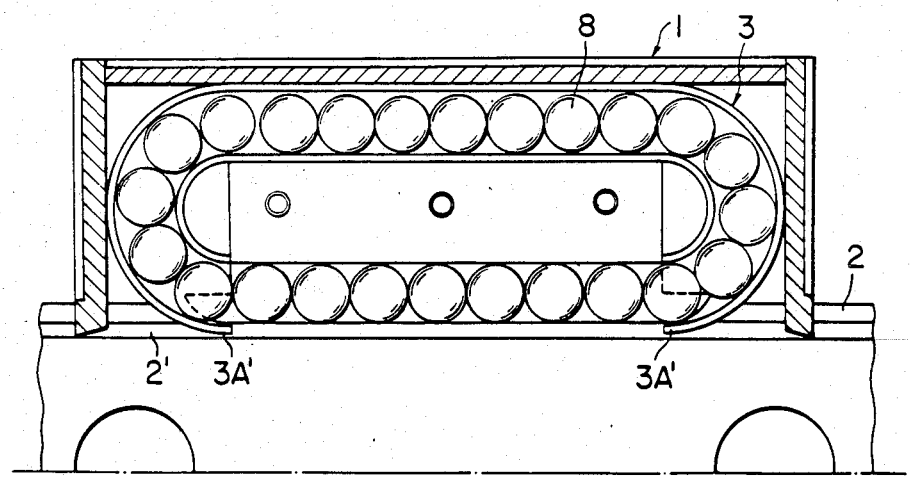
FIG. 5 is a sectional view in the direction of line V—V of FIG. 4.
Figure 6:
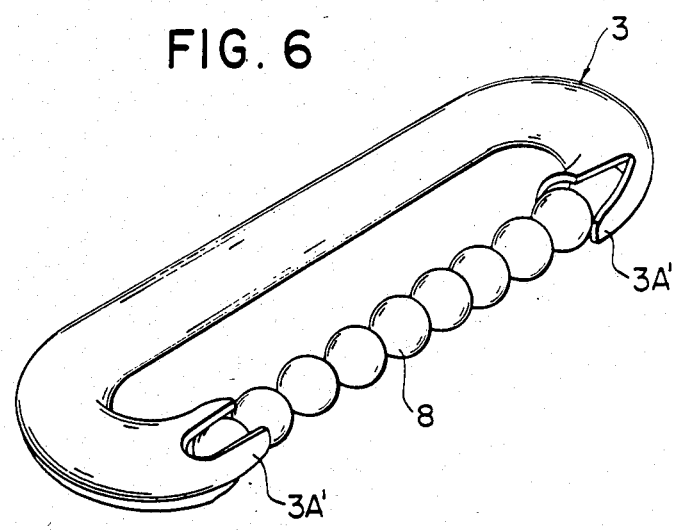
FIG. 6 is a partial perspective view of the second embodiment.

Further, FIGS. 4, 5 and 6 show the case of a single-row ball race, in which a two-part split position of tube is not a symmetrical position but a position eccentric by an amount corresponding to the width of scooping pawls 3A'. The same reference numerals as in the previous explanation represent the same or equivalent elements.

Figure 7:
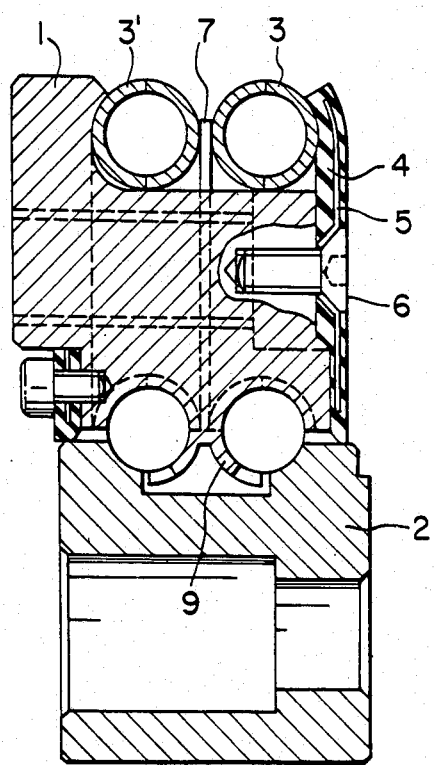
FIGS. 7 and 8 are sectional views corresponding to FIGS. 1 and 4, respectively, illustrating module type embodiments.
Figure 8:
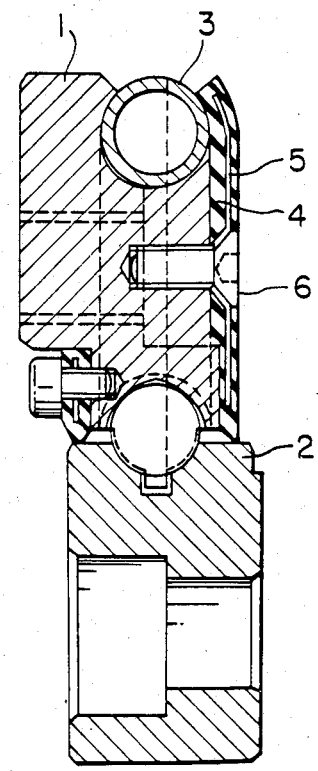

FIGS. 7 and 8 illustrate module type bearings for linear motion according to the present invention. FIG. 7 illustrates the case of two-row ball races and FIG. 8 illustrates the case of a single row. If the bearing body 1 and the track base 2 are made modular as shown in these figures, these modules can be used easily as a bearing for linear motion by, for example, screwing them to other machine parts (e.g. machine tool table and bed). Also in these embodiments, the same reference numerals as in the previous explanation represent the same or equivalent elements.

If the ball race is formed in the shape of a circular groove in the case of two rows and a Gothic arc groove in the case of a single row, it is made possible for both of them to receive loads equally in four directions. However, the shape of ball race per se is not an important point of the present invention. On this regard, any construction may be adopted.

Although in all of the illustrated embodiments the tube is disposed perpendicularly to the rail base, it may be disposed in an inclined manner.

Figure 9:
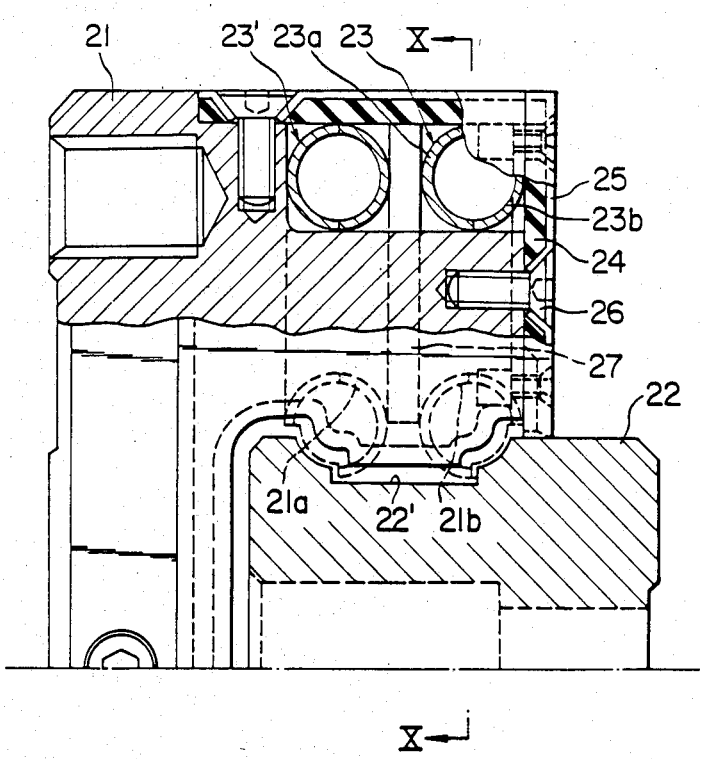
FIG. 9 is a longitudinal sectional view of a ball retainer integral type embodiment, with a lower half portion omitted.
Figure 10:
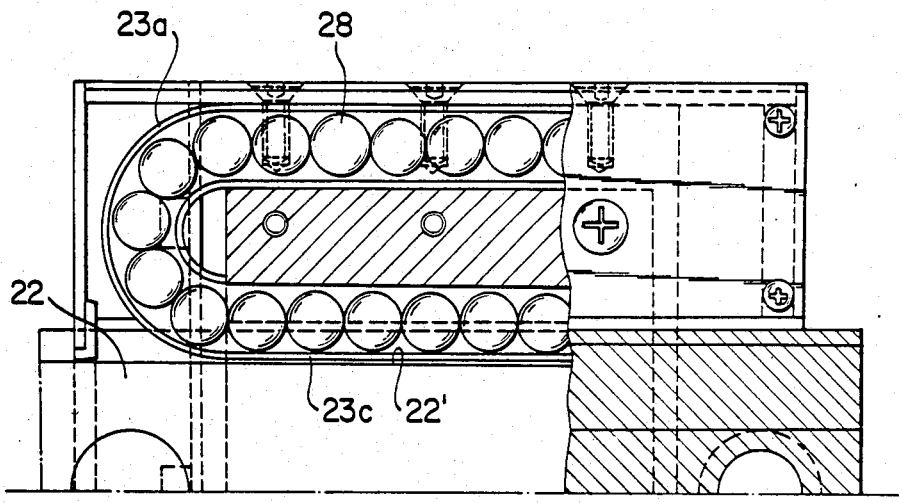
FIG. 10 is a sectional view in the direction of line X—X of FIG. 9.

Embodiments of the present invention will now be explained in which a separate provision of a ball retainer is not needed. FIGS. 9 and 10 show an example of using tubes in two rows, in which a lower half portion is omitted because upper and lower halves usually appear symmetrically.

The reference numeral 21 denotes a bearing body and 22 denotes a rail base. The numerals 23 and 23' denote tubes each comprising the combination of a pair of tube 23a of opposed U shape and tube 23b of opposed J shape. A cover 25 with rubber 24 fused thereto is put on the bearing body 21 and fixed with bolts 26. The numeral 27 denotes a spacer.

In such combination of the tubes, and endless circulation path can be formed easily by fixing the tubes to the bearing body 21 and abutting them to end faces of track grooves 21a and 21b of a semicircular section in the same way as in the first embodiment.

Figure 11:
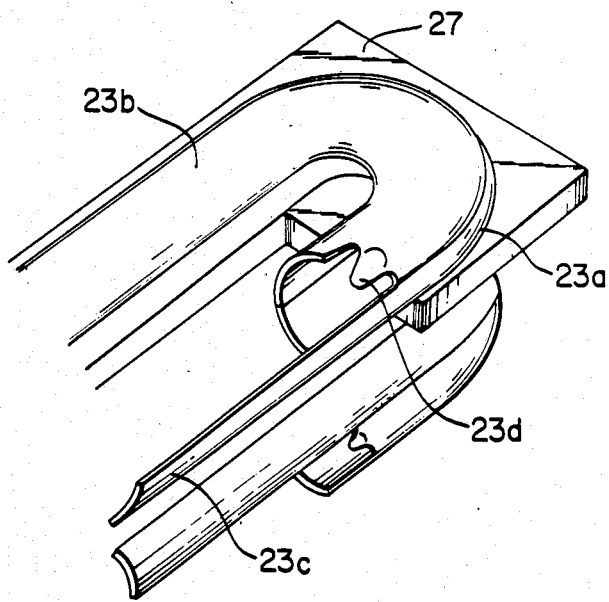
FIG. 11 is a partial perspective view of this embodiment.

As shown in FIGS. 10 and 11, a belt-like connection 23c of the tube 23a of opposed U shape extends along the bottom of a groove 22' of the rail base 22 and it functions as a ball retainer which holds balls between it and the track grooves 21a, 21b of the bearing body 21 when the bearing body is drawn out from the rail base 22. The numeral 23d denotes a ball scooping pawl.

Ball direction changing portions of the tubes 23 and 23' are made arcuate as shown in FIG. 10, thereby permitting a marked reduction of resistance.

Figure 12:
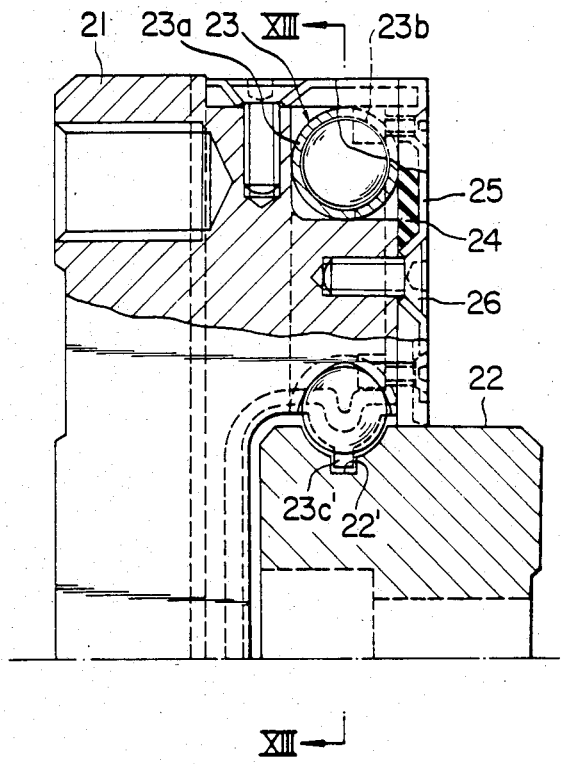
FIG. 12 is a view corresponding to FIG. 9, illustrating another embodiment.
Figure 13:
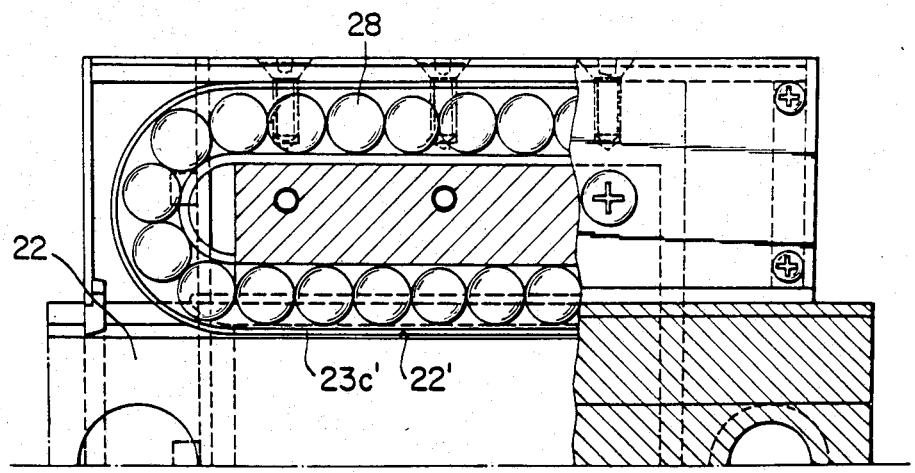
FIG. 13 is a sectional view in the direction of line XIII—XIII of FIG. 12.
Figure 14:
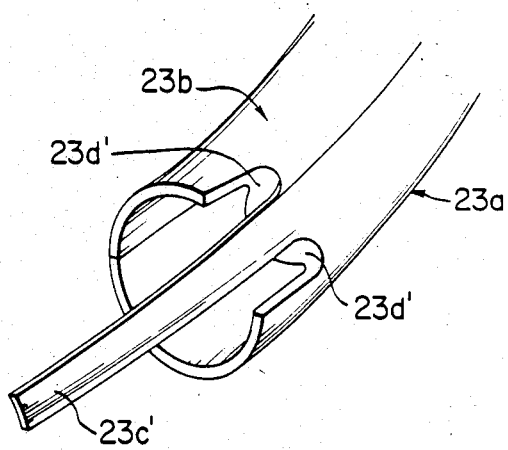
FIG. 14 is a partial perspective view of this embodiment.

FIGS. 12, 13 and 14 illustrate the case of a single-row race, in which a two-part split position of tube is not a symmetrical position because of a narrow width of a belt-like connection 23c', but is a position eccentric by ½ of the width of the belt-like connection 23c'. The function as a ball retainer is the same as in the embodiment of FIGS. 9 to 11. The numeral 23d' denotes a ball scooping pawl. The same reference numerals as in the previous explanation represent the same or equivalent elements.

It goes without saying that this ball retainer type embodiment can also be modified into such module type as shown in FIGS. 7 and 8.

A tube mounting cover will be explained below.

Figure 15:
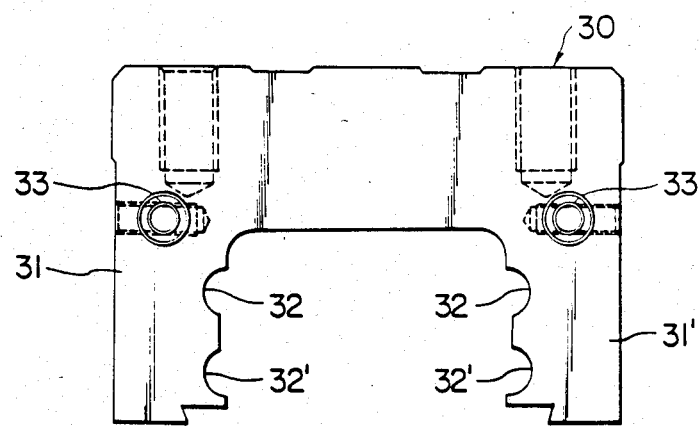
FIG. 15 is a front view of a bearing body.

FIG. 15 is a front view of a bearing body 30 in a tubular bearing for linear motion, in which loaded ball grooves 32 and 32' of a generally semicircular section (corresponding to 1a, 1b, 21a and 21b in the previous embodiments) are symmetrically formed inside a pair of leg portions 31 and 31'. One basic feature of this tubular bearing for linear motion is that it is not necessary at all to perform for the bearing body 30 a machining for ball return holes or a curving work for connecting loaded ball races with ball return holes at end portions, other than machining of the above loaded ball races.

FIGS. 16 to 18 illustrate a combined tube 40 which comprises the combination of a tube half of opposed J shape (corresponding to 23b in FIG. 11) and a tube half 42 of opposed U shape (corresponding to 23a in FIG. 11). An endless ball circulation path is formed by abutting end faces of the load ball grooves 32 and 32' to the bearing body 30. The tube half 42 has a belt-like connection 43 (corresponding to 23c in FIG. 11) which functions to hold balls between it and the loaded ball grooves of the bearing body.

FIG. 19 illustrates a section of a rail base 50. Balls (not shown) are held in rolling contact between loaded ball grooves 51, 51' of the rail base 50 and loaded ball grooves 32, 32' of the bearing body 30, whereby a linear guide is performed at a low friction.

FIGS. 20 and 21 illustrate an end cover 60 according to the present invention for mounting an end portion of the tube 40 to an end portion of the bearing body 30. The outer surface of the cover 60 is plane, and on its inner surface side are formed two rows of grooves 61 and 61' with a separation zone 62 provided therebetween. The numeral 63 denotes a circular projection formed on the inner surface side of the cover 60. By fitting it in a hole 33 (see FIG. 15) formed in an end face of the bearing body 30, the positioning of the cover 60 can be done easily.

In assembling this bearing, the bearing body 30 is turned upside down and put on an assembly jig, then a tube half of opposed J shape, balls, a tube half of opposed U shape, a tube half of opposed U shape, balls and a tube half of opposed J shape are put one upon another in this order, and thereafter the covers 60 are fitted from both end portions and fixed with bolts. The numerals 64 in FIGS. 20 and 21 denotes a mounting bolt hole.

Between the bearing body 30 and the curved end portions of the tube 40 there remain spaces corresponding to the hatched portions in FIG. 16. It is a spacer 70 that is used for filling such spacings and keeping appropriate the spacing between the two rows of tubes. An end wall 71 is a portion which is in contact with an end portion of the bearing body 30, and curved wall portions 73 and 73' conforming to the direction changing portions of the tube are provided vertically symmetrically with a separation zone 72 put therebetween. By using such spacer 70, the spaces between the tube 40 and the bearing body 30 are filled, and the tube 40 can be prevented from being deformed even when the cover 60 is bolted; besides, the tube 40 can be mounted to the bearing body 30 with a high accuracy.

Figure 26:
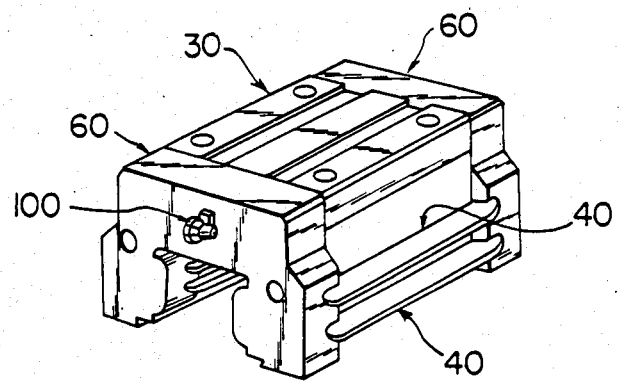
FIG. 26 is a perspective view showing an assembled state with side cover removed.
Figure 27:
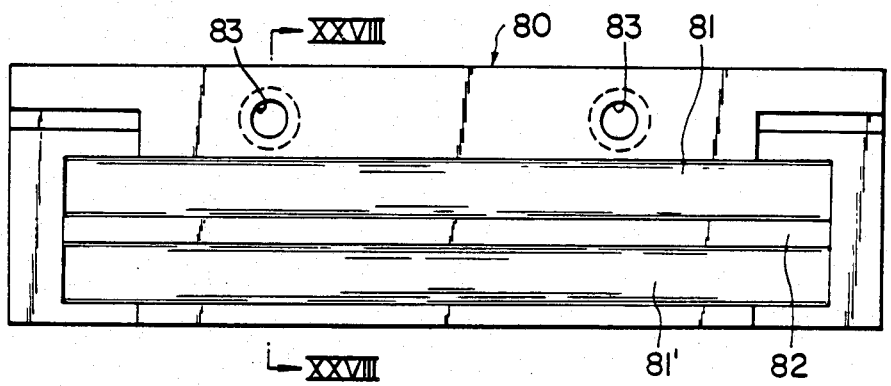
FIG. 27 is a front view of a side cover.
Figure 28:
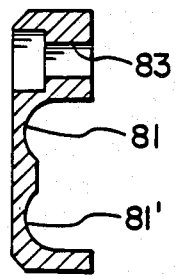
FIG. 28 is a sectional view in the direction of line XXVIII—XXVIII of FIG. 27.
Figure 29:
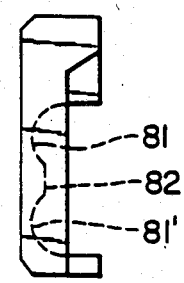
FIG. 29 is a side view of the side cover.

It is the assembly shown in FIG. 26 that is obtained by assembling the parts explained above. In this case, the tube 40 is still exposed at side portions of the bearing body 30, so such a side cover 80 as shown in FIGS. 27 to 29 is used where such portions are to be covered. The outer surface of the side cover 80 is plane, and in the inner surface thereof are formed two rows of grooves 81 and 81' adapted to engage the tube 40, with a separation zone 82 provided therebetween. The numeral 83 denotes a mounting bolt hole. By using such side cover 80, the tube 40 shown in FIG. 26 is covered completely without being exposed at all to the exterior, whereby a travelling noise damping function and a tube protecting function can be attained.

The above explanation is of the case where the tube 40 is provided in two rows. But, there also is the case where only a single row of tube is used. In this case, the present invention can be practiced after an appropriate modification, of course. As to the bearing itself, its shape is not limited to the symmetric shape explained above; only one of right and left sides can be made a unit type module of a bearing body and a rail base each having a ball circulation path. It goes without saying that the present invention is also applicable to such a case.

Figure 30:
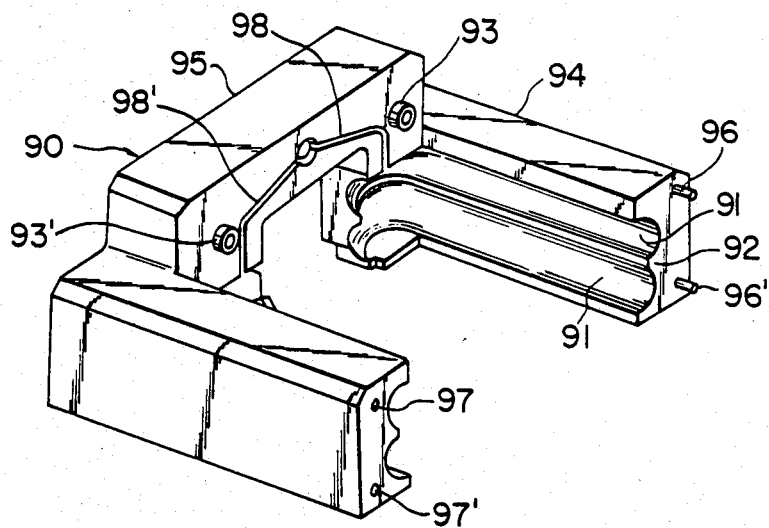
FIG. 30 is a perspective view of an embodiment of an integral type cover.

An embodiment will be described below with reference to FIG. 30 in which a tube end face cover and side covers are integrated as one body.

Two rows of grooves 91 and 91' adapted to engage the ball direction changing portions and linear portions of the tubes 40 are provided with a separation zone 92 put therebetween. The numerals 93 and 93' are circular projections adapted to be fitted in holes 33 formed in an end face of the bearing body 30 thereby facilitating the positioning of a cover 90.

The cover 90, which is ⊐-shaped when viewed from above, comprises side covers 94 and an end face cover 95 formed integrally as one body. A pair of covers 90 of the same shape are mounted from both ends so that projections 96 and 96' and holes 97 and 97' are engaged with the respective mating holes and projections.

The numerals 98 and 98' represent a pair of lubricant feed grooves as will be explained later.

The shape of the grooves 91 and 91' at the junction between the side cover 94 and the end face cover 95 is not always required to be round; it may be square.

Lastly, the following description is provided about lubrication of the above tubular bearing for linear motion.

Such lubricant feed ports 44 and 45 as shown in FIG. 16 are provided in the curved portions of the tube when lubricant is fed from end portions of the bearing body 30, and in the inner peripheral wall of the rectilinear portion of the tube when lubricant is fed from the side.

Lubricant fed from a nipple 100 shown in FIG. 26 passes through a hole 65 of the end cover 60 shown in FIG. 20, then flows in both directions through grooves 66 and 66' (98 and 98' in FIG. 27) and reaches the hatched spaces in FIG. 16.

In the case where the spacer 70 shown in FIGS. 23 to 25 is not used, the lubricant after filling such spaces flows through the feed ports 44 into the tube 40 and spreads throughout the circulation path with circulation of the balls. Where the spacer 70 is used, a hole 74 is formed vertically in the spacer 70, and lubricant is allowed to flow through this hole 74 to the feed ports 44 of the upper and lower tubes 40.

Figure 31:
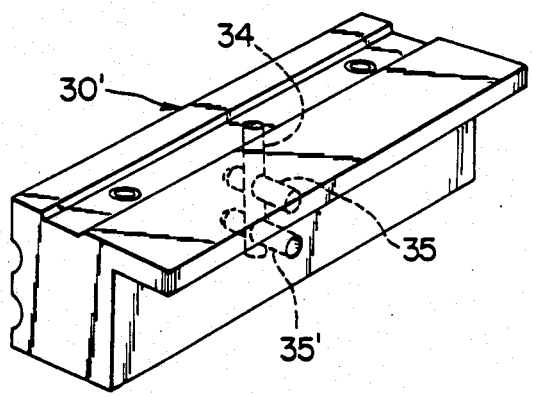
FIG. 31 is a perspective view of an embodiment of a module type bearing body having a lubricant feed port.

FIG. 31 illustrates a module type bearing body 30' in which lubricant is fed to the side feed port 45. Lubricant is fed to the feed port 45 of each tube 40 through a longitudinal hole 34 and transverse holes 35 and 35'. In this case, the bearing body-side holes and the tube-side feed ports are not bonded completely, so it is desirable to use a sealing agent for sealing gaps.

Although the above explanation is of the case where the tube 40 is provided in two rows, there also is the case where only a single row of tube is used. In this case, the present invention can be practiced after an appropriate modification, of course.

The leakage of lubricant can be prevented also by the tube mounting cover, but a rubber seal or the like is to be used where it is desired to reduce the leakage.

What is claimed is:

1. A linear motion ball bearing comprising a rail base having at least one ball groove for loaded balls; a bearing body arranged for linear movement along the rail base; at least one tube of opposed J-shape carried by the bearing body and defining the reversing and return portions of a ball circulation path having opposed openings at ends of said reversing portions, the tube being split longitudinally along the ball circulation path into two parts, each part having an opposed J-shape with two opposed, spaced tips, load-bearing groove means in the bearing body extending substantially from one of said openings to the other and opposed to the loaded ball groove of the rail base, and ball retainer means opposed to said groove means and extending substantially from one tip of one of the tube parts to the other tip of the same tube part along the loaded ball groove of the rail base, said ball retainer means being supported, at least in part, by said one of the tube parts.

2. A linear motion ball bearing according to claim 1 in which the ball retainer means is a unitary part of said one of the tube parts.

3. A linear motion ball bearing according to claim 2 in which the ball retainer means comprises two projections, one extending from one tip of said one of the tube parts and the other extending from the other tip of the same tube part, said projections meeting each other at an intermediate location between said tips of said one of the tube parts.

4. A linear motion ball bearing according to claim 1 having a tube mounting cover supported on the bearing body, the mounting cover having a groove conforming to and receiving at least a portion of said tube.

5. A linear motion ball bearing according to claim 1 having at least one end face cover secured to the bearing body and extending from one side of the bearing body to the other in a direction transverse to the direction of movement of the bearing body on the rail base, and a pair of side covers extending parallel to each other from the end face along opposite sides of the bearing body in the direction of movement of the bearing body along the rail base, at least one of said side covers having a groove conforming to and receiving at least a portion of said tube, and said side covers both being unitary with said end face cover.

6. A linear motion ball bearing according to claim 1 having a lubricant feed port in part of the inner peripheral wall of said tube.

* * * * *